United States Patent Office 3,567,584
Patented Mar. 2, 1971

3,567,584
PROCESS FOR THE PREPARATION OF
ERGOCORNINE AND ERGOSINE
Alba Maria Amici, Via Morigi 13; Anacleto Minghetti, P.zza Vesuvio 23; and Celestino Spalla, Via L. Soderini 21, all of Milan, Italy
No Drawing. Filed July 2, 1968, Ser. No. 741,884
Claims priority, application Italy, Feb. 26, 1968, 13,195/68
Int. Cl. C12b 1/08; C12k 1/10
U.S. Cl. 195—81                                       1 Claim

ABSTRACT OF THE DISCLOSURE

The present invention relates to a new microbiological process for the production of ergosine and ergocornine employing the new strain Claviceps purpurea F.I. 43/14 which has also been given the index number ATCC 20106 by the American Type Culture Collection, Rockville, Md. 20852, U.S.A. By the process of the invention, good yields with a high purity of a mixture in practically equal parts of the alkaloids ergocornine and ergosine are obtained.

---

Our invention is to a fermentative process for the production of ergocornine and ergosine. More particularly, our invention relates to a new microbiological process for the production of ergosine and ergocornine employing the new strain Claviceps purpurea F.I. 43/14 (number of the microbiological collection of Società Farmaceutici Italia). The microorganism has also been given the index number ATCC 20106 by the American Type Culture Collection, Rockville, Md. 20852, U.S.A., and the index number I.P.V. F–297 by the Institute of Plant Pathology at the University of Milan, Milan, Italy. At the latter institute the microorganism is readily available. By the process of the invention good yields with a high purity of a mixture of practically equal parts of the alkaloids ergocornine and ergosine are obtained.

Ergocornine and ergosine belong to the group of the ergot alkaloids. The literature describes their chemical structures and for ergocornine in particular the pharmacological activity and its use as hypotensive and in the therapy of the peripheric-vascular troubles.

The new strain Claviceps purpurea F.I. 43/14 producing said alkaloids has been isolated from a sclerotium of ergot collected on a rye-thorn at Usseglio (Val di Lanzo Torinese), Italy. It shows the following morphological properties.

MICROSCOPIC PROPERTIES

On the cultural agar media, the colonies are formed by more or less sinuous wound hyphae, 3–4$\mu$ thick. The hyphae are scarcely branched. Some ramifications rise directly from contact with air (aerial hyphae). The latter can form conidia, but are absent in most media.

The mycelium of the submerged cultures (7–10 days of age: productive phase) has the appearance of tufts of hyphae consisting in very irregular cells of thickness varying from 3 to 10$\mu$. Sometimes the cells are swelled up and round and the hyphae look like a necklace. Conidia can be formed.

MACROSCOPIC PROPERTIES

The macroscopic properties had been taken in cultures incubated at 28° C. for 15 days on the slants of various media. The composition of the media is reported in Table 1.

$C_z4$ medium.—Fair development with irregular reliefs, from colorless to flesh-pink; back-side of the colony: colorless. Soluble pigments: absent; conidia: absent.

$C_z4M$ medium.—Good development in extended patina, irregularly waved, from colorless to pale pink; back-side: colorless. Soluble pigments: absent; conidia: absent.

Potato-glucose medium.—Fair development with little reliefs, whitish with violet spots or completely reddish-violet; back-side of the colony with violet or clearly violet patches. Soluble pigments: absent; conidia: generally absent, present only in some transfers.

S medium.—Good development, with irregular reliefs; pink colored; back-side of the colony from colorless to pink. Soluble pigments: absent; conidia: absent.

Saccharose-peptone medium.—Good development, with large, rather flat folds; from colorless to violet pink or dark violet; back-side from colorless to more or less deep violet. Soluble pigments absent or reddish-violet; conidia: absent.

$T_2$ medium.—Very good development, with large relieved folds; from violet-pink to deep violet; back-side from light violet to dark violet. Soluble pigments: absent; conidia: present in small quantity.

TABLE 1

| | Media | | | | | |
|---|---|---|---|---|---|---|
| Compounds | Cz4 | Cz4M | Glucose-potato | S | Saccha-rose-peptone | T$_2$ |
| Glucose, grams | 40 | 40 | 20 | 40 | | |
| Saccharose, grams | | | | | 300 | 100 |
| Peptone, grams | | | | 8 | 10 | |
| Vegetable extract for broth, grams | | | 1 | | | |
| Yeast extract, grams | | | | | | 0.1 |
| Asparagine, grams | | | | | | 10 |
| (NH$_4$)$_2$HPO$_4$, grams | 5 | 5 | | | | |
| K$_2$HPO$_4$, grams | 1 | 1 | | | | |
| KH$_2$PO$_4$, grams | | | | | 0.5 | 0.25 |
| MgSO$_4$·7H$_2$O, grams | 2.5 | 2.5 | | | 0.5 | 0.25 |
| KCl, grams | 0.5 | 0.5 | | | | 0.125 |
| FeSO$_4$·7H$_2$O, milligrams | 10 | 10 | | | 7 | 20 |
| ZnSO$_4$·7H$_2$O, milligrams | 10 | 10 | | | 6 | 15 |
| Ca(NO$_3$)$_2$·4H$_2$O, grams | | | | | | 1 |
| Cistein-hydrochloride, milligrams | | | | | | 10 |
| Agar, grams | 18 | 18 | 18 | 18 | 18 | 18 |
| Aqueous potato extract [1], centimeters | | | 500 | | | |
| Distilled water | ([2]) | ([2]) | ([2]) | ([2]) | ([2]) | ([2]) |
| pH | 6.7 | 6.7 | 7.2 | 6.4 | 6.2 | 5.2 |
| Sterilization | ([3]) | ([3]) | ([3]) | ([3]) | ([3]) | ([3]) |

[1] Preparation of the aqueous potato extract: 200 g. of peeled potatoes are cut into little pieces, then they are boiled for 45 minutes in 500 cc. of tap water; it is filtered through a gauze and taken up to volume.
[2] To 1,000 cc.
[3] At 110° C. per 20'.

Our invention has as an object a microbiological process for the preparation of a mixture, in practically equal parts, of the alkaloids ergocornine and ergosine, which comprises culturing the new microorganism Claviceps purpurea F.I. 43/14 in a medium containing carbon, nitrogen sources and mineral salts, extracting and then separating the alkaloids. More particularly, the microorganism is cultivated in a liquid cultural medium under aerobic conditions in submerged culture at a temperature between 20 and 30° C., preferably 24° C., over a period of from 10 to 16 days. The pH may vary, according to the fermentation media employed, from 3.5 to 6. Glucose, saccharose, mannite, sorbite, glycerin, citric acid, succinic acid may be used as carbon source. The nitrogen source may consist of ammonia, asparagine, peptone, casein hydrolyzates and ammonium salts such as sulphate and chloride and other substances of common use. The mineral salts useful for the production of the alkaloids include chlorides, phosphates, sulphates, magnesium, iron, zinc, manganese and potassium.

The strain *Claviceps purpurea* F.I. 43/14 may be stored by lyophilization or by successive transfers on $C_z4$ medium or peptone-saccharose medium. The lyophilization is performed taking the mycelium of a slant and pulping it with very fine quartz powder. The mycelium is then suspended in 4 cc. of a mixture consisting of 2 parts of a 60% sterile aqueous saccharose solution and 1 part of sterile milk. It is distributed in flasks and lyophilized.

The fermentation may be performed in Erlenmeyer flasks and in laboratory and industrial fermenters of various capacity. The alkaloids obtained are separated and purified following known extraction techniques with solvents and by chromatography.

The following examples are to illustrate the invention without limiting it.

EXAMPLE 1

A transfer, from a stock of cultures on slants of $C_z4M$ medium, described in Table 1, was effected on a slant of the same medium. It was then incubated for 10 days at 28° C. and the culture thus obtained was used to inoculate two 300 cc. flasks. Each flask contained 50 cc. of the following TS medium:

L-asparagine—10 g.
$KH_2PO_4$—0.5 g.
$MgSO_4 \cdot 7H_2O$—0.3 g.
Yeast extract—0.1 g.
$FeSO_4 \cdot 7H_2O$—7 mg.
$ZnSO_4 \cdot 7H_2O$—6 mg.
Saccharose—100 g.
Distilled water to 1000 cc.

The pH was adjusted before sterilization with sodium hydroxide to 5.2. The sterilization was 110° C. for 20 minutes. The flasks were incubated for 5 days at 24° C. on a rotary shaker at 220 strokes per minute with 3.5 cm. of eccentricity. The cultures thus obtained were employed in a 10% ratio to inoculate 300 cc. flasks containing 50 cc. of the following medium 668:

Saccharose—60 g.
Glycerin—60 cc.
Glucose—80 g.
Yeast extract—0.1 g.
Citric acid—15 g.
KCl—0.125 g.
$KH_2PO_4$—0.5 g.
$MgSO_4 \cdot 7H_2O$—0.5 g.
$FeSO_4 \cdot 7H_2O$—7 mg.
$ZnSO_4 \cdot 7H_2O$—6 mg.
Distilled water to 1000 cc.

The pH was adjusted to 5.2 with ammonia. Sterilization was at 100° C. for 20 minutes.

After 12–14 days of incubation in the conditions described for the vegetative cultures, the cultures contained 950 γ/cc. of a mixture of alkaloids consisting of 45% of ergosine and 55% of ergocornine. The contents of 120 flasks having from 950 to 1100 γ/cc. were collected and filtered. The filtrate and the mycelium were extracted separately. The filtrate (flask filtrate), corresponding to 5 liters, was adjusted to pH 9 with sodium carbonate and extracted twice, each time with 3 liters of chloroform. The mycelium was agitated with a 50% aqueous acetone solution containing 2% of tartaric acid and filtered. This mycelium filtrate was adjusted to pH 9 with sodium carbonate and extracted three times with chloroform. The chloroform extracts of the flask filtrate and of the mycelium filtrate were collected together, and evaporated under vacuum at 20–30° C. to about one fifth of the original volume and extracted with a 2% tartaric acid solution. The tartaric solution was alkalized to pH 9 and extracted with chloroform. The chloroform extract was evaporated to a small volume and the crude product was precipitated with hexane. The crude product thus obtained after drying under vacuum, weighed 6.2 g.

This product, dissolved in a small volume of chloroform, was passed through a column of 400 g. of silica gel in chloroform. Eluting with chloroform, a fraction containing ergocornine was obtained which was dried under usual conditions. The residue was dissolved in benzene at the ratio of 1:20 and then concentrated to a quarter of the original volume. After standing overnight at 5° C., 2.5 g. of ergocornine-base were obtained, which was recrystallized from methyl alcohol and had a melting point of 182° C. The empiric formula is $C_{31}H_{39}N_5O_5$; $[\alpha]_D^{20°} = -186$ (c.=1% in chloroform); the Keller and Van Urk reactions are positive and the spectrum in the U.V. has a maximum at 310 mμ in methanol. By acid hydrolysis, it gives valine and proline; by alkaline hydrolysis, it gives lysergic acid and dimethylpyruvic acid.

Carrying on the elution of the column of silica with chloroform and 4% methanol, a second fraction was obtained which contains 2.1 g. of ergosine. This has the empiric formula $C_{30}H_{37}O_5N_5$; $[\alpha]_D^{20°} = -183$ (c.=1% in chloroform), spectrum in the U.V. in methanol with a maximum at 310 mμ and positive reaction with the Keller and Van Urk reagents.

The hydrochloride, crystallized from acetone, has a melting point of 235° C.; by acid hydrolysis, it gives leucine and proline and by alkaline hydrolysis it gives lysergic acid and pyruvic acid.

EXAMPLE 2

The operation was as in Example 1, except that cultures on slants of $C_z4$ medium were used and that the production was performed on the following T25 medium:

Saccharose—300 g.
Citric acid—15 g.
Yeast extract—0.1 g.
KCl—0.125 g.
$KH_2PO_4$—0.5 g.
$MgSO_4 \cdot 7H_2O$—0.5 g.
$FeSO_4 \cdot 7H_2O$—7 mg.
$ZnSO_4 \cdot 7H_2O$—6 mg.
Distilled water to 1000 cc.

The pH was adjusted with ammonia to 5.2 and the sterilization was at 120° C. per 20 minutes.

After 12–14 days of incubation, the cultures contained 1100 γ/cc. of a mixture of alkaloids consisting of 60% of ergocornine and 40% of ergosine.

EXAMPLE 3

The operation was as in Example 1 except that cultures on slants of $C_z4$ medium were used and that the production was performed on the following TSM medium:

Saccharose—250 g.
Asparagine—10 g.
$KH_2PO_4$—0.5 g.
$MgSO_4 \cdot 7H_2O$—0.3 g.
Yeast extract—0.1 g.
$FeSO_4 \cdot 7H_2O$—7 mg.
$ZnSO_4 \cdot 7H_2O$—6 mg.
Distilled water to 1000 cc.

The pH was adjusted to 5.2 with sodium hydroxide and the sterilization was at 120° C. for 20 minutes.

After 12–14 days of incubation, the cultures contained 960 γ/cc. of a mixture of alkaloids consisting of 55% of ergocornine and 45% of ergosine.

We claim:
1. A microbiological process for the preparation of a mixture of the ergot alkaloids consisting of ergocornine and ergosine, which comprises cultivating the microorganism *Claviceps purpurea* F.I. 43/14 under aerobic conditions in submerged culture, in a liquid nutrient medium containing a carbon source, a nitrogen source and mineral salts at a temperature of from 20 to 30° C., for from 10 to 16 days at a pH between 3.5 and 6, and extracting and separating the alkaloids so formed.

References Cited

UNITED STATES PATENTS

| | | | |
|---|---|---|---|
| 2,809,920 | 10/1957 | Stoll et al. | 195—81 |
| 2,936,266 | 5/1960 | Windisch | 195—81 |
| 3,110,651 | 11/1963 | Kybal et al. | 195—81 |
| 3,117,917 | 1/1964 | Adams | 195—81 |
| 3,276,972 | 10/1966 | Amici et al. | 195—81 |
| 3,485,722 | 12/1969 | Amici et al. | 195—81 |

JOSEPH M. GOLIAN, Primary Examiner